United States Patent
Desmond (10) Patent No.: US 7,444,205 B2
(45) Date of Patent: Oct. 28, 2008

(54) MODULAR SELF STRUCTURING AND COMPUTING SYSTEM

(76) Inventor: Neil Desmond, 14992 Alaska Rd., Woodbridge, VA (US) 22191

( * ) Notice: Subject to any disclaimer, the term of this patent is extended or adjusted under 35 U.S.C. 154(b) by 671 days.

(21) Appl. No.: 10/975,405

(22) Filed: Oct. 29, 2004

(65) Prior Publication Data

US 2006/0101547 A1    May 11, 2006

(51) Int. Cl.
    *G06F 19/00*    (2006.01)
(52) U.S. Cl. .......................................... 700/245; 901/1
(58) Field of Classification Search ................. 700/245, 700/900; 977/724, 882, 963; 403/46, 109.1, 403/93, 97, 102, 140, 185, 410; 901/1, 50
    See application file for complete search history.

(56) References Cited

U.S. PATENT DOCUMENTS

| | | | |
|---|---|---|---|
| 4,109,398 A | 8/1978 | Hida | |
| 4,608,525 A | 8/1986 | Mori et al. | |
| 4,697,472 A | 10/1987 | Hiyane | |
| 4,964,062 A | 10/1990 | Ubhayakar et al. | |
| 5,040,626 A | 8/1991 | Paynter | |
| 5,103,403 A | 4/1992 | Ch'hayder et al. | |
| 5,142,932 A | 9/1992 | Moya et al. | |
| 5,145,130 A | 9/1992 | Purves | |
| 5,241,875 A | 9/1993 | Kochanneck | |
| 5,361,186 A * | 11/1994 | Tanie et al. | 361/191 |
| 5,435,405 A | 7/1995 | Schempf et al. | |
| 5,452,199 A | 9/1995 | Murata | |
| 5,515,934 A | 5/1996 | Davis | |
| 5,523,662 A | 6/1996 | Goldenberg et al. | |
| 5,662,587 A | 9/1997 | Grundfest et al. | |
| 5,672,924 A | 9/1997 | Wallace et al. | |
| 5,764,518 A | 6/1998 | Collins | |
| 5,988,845 A | 11/1999 | Murata | |
| 6,075,924 A | 6/2000 | Will | |
| 6,084,373 A * | 7/2000 | Goldenberg et al. | 318/568.11 |
| 6,095,011 A | 8/2000 | Brogårdh | |
| 6,150,738 A | 11/2000 | Yim | |
| 6,157,872 A | 12/2000 | Michael | |
| 6,233,502 B1 | 5/2001 | Yim | |
| 6,233,503 B1 * | 5/2001 | Yim et al. | 700/245 |

(Continued)

OTHER PUBLICATIONS

Toth-Fejel, "Agents, Assemblers, and ANTS Scheduling Assembly with Market and Biological Software Mechanisms", http://www.foresight.org/Conferences/MNT7/Papers/Toth-Fejel/, 2003.

(Continued)

*Primary Examiner*—Khoi H. Tran
*Assistant Examiner*—Nicholas Kiswanto
(74) *Attorney, Agent, or Firm*—Diederiks & Whitelaw, PLC (57) ABSTRACT

A modular self-structuring computing system includes a matrix formed of a plurality of modules. Each module has a set of connecting legs, a set of connecting plates, an internal computer system and an internal power system. Preferably, a center housing is provided with six extending legs having connecting plates on the end of each leg. The housing, or core, supports the legs in a pivotal manner and includes compartments for energy cells and a computer processor. Groups of elements may be formed into a matrix type structure and by directing various modules to move or pivot their legs, the overall structure can move to change its shape and/or size.

11 Claims, 9 Drawing Sheets

U.S. PATENT DOCUMENTS

| | | | |
|---|---|---|---|
| 6,243,622 B1 | 6/2001 | Yim et al. | |
| 6,341,614 B1 * | 1/2002 | Tucker et al. | 135/75 |
| 6,546,315 B1 | 4/2003 | Michael | |
| 6,568,869 B1 | 5/2003 | Murata | |
| 6,575,802 B2 | 6/2003 | Yim et al. | |
| 6,636,781 B1 * | 10/2003 | Shen et al. | 700/248 |
| 6,686,717 B2 | 2/2004 | Khairallah | |
| 6,725,128 B2 * | 4/2004 | Hogg et al. | 700/245 |
| 6,786,896 B1 | 9/2004 | Madhani et al. | |
| 2003/0040250 A1 | 2/2003 | Yin et al. | |
| 2003/0097203 A1 | 5/2003 | Michael | |
| 2004/0103738 A1 | 6/2004 | Gao et al. | |

OTHER PUBLICATIONS

Hall, " Utility Fog: The Stuff that Dreams are Made Of", http://discuss.foresight.org/~josh/Ufog.html, 2003.

Author Unknown, "Modular Reconfigurable", http://www2.parc.com/spl/projects/modrobots/, 2003.

* cited by examiner

MODULAR SELF STRUCTURING AND COMPUTING SYSTEM

BACKGROUND OF THE INVENTION

1. Field of the Invention

The present invention is generally directed to a modular self structuring and computing system. More particularly, the invention is directed to numerous modules that may be fit together into a system by various connection devices and communication channels that allow the modules to move relative to one another to form themselves into desired objects or mechanical devices.

2. Discussion of the Prior Art

Currently, in many diverse applications, fields or professions, mechanisms are formed to essentially do one dedicated task. Even those devices which may do multiple tasks are formed with a particular configuration and have very little adaptability to conduct other tasks or change their shape in any meaningful manner. For example, although a computer can be manufactured so that it has certain types of processors, ram, memory or hard drives and further may be programmed to do numerous different tasks, the computer structure itself is essentially static. In other words, if a memory chip needs to be replaced, the box or container for the computer must be opened, the old ram chip or hard drive must be removed and a new chip is placed in the computer.

The structure in typical non-computing devices is even more difficult to change once the devices are manufactured. Objects as simple as forks, knives or spoons or various equipment around the office, such as clipboards and paper clips or even personal use items, such as cameras, eyeglasses, earphones or amusement devices are all pretty much manufactured in their final form. At best, the most adaptable Swiss army knife may have numerous different blades but each blade is cast or manufactured in its final form and simply may be rotated to an operational or non-operational position. For example, the knife cannot become a fork and the fork cannot become a spoon, etc.

On a larger scale, such as, for example, at a manufacturing site, numerous different machines must be used, one for each task. A crane, a forklift and a dump truck all are separately manufactured, have very specific tasks they perform and are brought to a construction site when needed. Recently, some construction equipment has been provided with interchangeable tools. A backhoe may change the tool on its arm from a bucket to a drill, etc. However, even then a selection of different tools must be available.

The equipment on a fire truck provides a good example of how specific tools have become. When firemen on a fire truck arrive at the scene of an accident or fire, they must bring numerous different types of equipment, such as ladders or hoses, axes and the like so that they have the right tool for the right job. Clearly, a reduction in the amount of needed tools would be helpful. Furthermore, the vehicles themselves tend to be very specific. A police car is different from a fire truck which is different from an ambulance, etc. Once again, because once these devices have an essentially static configuration after they are manufactured, any desired modifications to the vehicle must be made in a factory or repair shop.

On a much smaller scale, various parts of tools, such as a knife or parts of a car, such as sensors, indicators, accelerators, brake pedals, transmissions, etc., are all statically formed. At best, for example, a seat in the car might be adjusted forward and back or folded to place the vehicle into a cargo-carrying configuration from a passenger-carrying configuration. However, no fundamental change to structure is designed into these devices.

Some solutions have been prepared to address these problems. For example, Utility Fog is a nanotechnology based idea wherein tiny robots form a layer of interrelated units that are connected to one another. The tiny robots can move relative to one another in order to change the shape of an object. For example, they can change the appearance of furniture so that one style of furniture becomes another style. However, currently, Utility Fog falls short on details. For example, Utility Fog, as disclosed, does not have a particularly good mechanism for connecting the various robots or storing energy. Furthermore, manipulating the units relative to one another or developing an effective communication scheme that allows the units to talk to one another has not been developed.

U.S. Pat. No. 5,988,845 discloses a universal unit for automatically configuring three-dimensional structures to desired shapes. This patent is generally directed to three-dimensional structures which may be formed by grouping large numbers of three-dimensional universal units. While this patent does disclose more details regarding the transmission of power from one unit to another and a connecting mechanism, once again, the way these units are connected and move relative to one another are particularly cumbersome and inefficient.

Finally, U.S. Pat. No. 4,608,525 discloses a cellular type robot apparatus. The robot cells are coordinated so that each cell can be controlled so as to operate in concert with one another. Once again, this patent does not disclose a particularly efficient manner of connecting these units or moving them relative to one another.

Regardless of these solutions, we can see that there exists a need in the art for a self-structuring modular system which has an efficient manner of connecting the sub units, providing communication and computing power and allowing the elements to move quickly and rapidly from one position to another relative to each other.

SUMMARY OF THE INVENTION

The present invention is directed to a modular self structuring computing system including a matrix formed of a plurality of modules. Each module has a set of connecting legs, a set of connecting plates, an internal computer system and an internal power system. Preferably, a center housing is provided with six extending legs having connecting plates on the end of each leg. The housing, or core, supports the legs in a pivotal manner and includes compartments for energy cells and a computer processor. A small amount of memory can be located within the housing or within each set of module legs. Typically, each leg may pivot about two axes and can be extended away from and retracted towards the housing. Various types of actuators may be used to pivot, extend and retract the legs.

In order to have the computing system understand its orientation, each side of the housing of the six sides is numbered and identified. The connecting plates are also rotatable so as to engage one another. Communication systems are provided between the connecting plates so that one module may connect and thus communicate with another module.

Groups of modules may be formed into a matrix type structure and by directing various modules to move or pivot their legs, the overall structure can move to change its shape and/or size. Additionally, modules may move from spot to spot by connecting and disconnecting legs in an orderly fashion. For example, a single module at a time may be moved from one end of the overall matrix to another, thus moving the overall matrix in a slow and orderly fashion. Furthermore, one set of modules may be programmed to move relative to another set to cause linear or rotational motion. Alternatively, a plurality of modules may be added to a matrix and then moved to an appropriate position, resulting in a matrix that has a desired shape and size.

Power and computing for each module is also transmitted along with the communication. If one module loses power, other modules may divert power to that module from a different source. Finally, each module can have or be assigned a unique identification value or address, thus allowing a particular module to be given instructions for a desired task.

With this system, a matrix of modules may form any desired shape and perform any desired function. A matrix could start as a spoon and change into a fork. A fire truck would only have to carry one tool or none if the truck itself was formed from modules. In a construction site, a single machine formed of a matrix of modules could quickly adapt to perform numerous jobs at the site.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENTS

Figure 1:
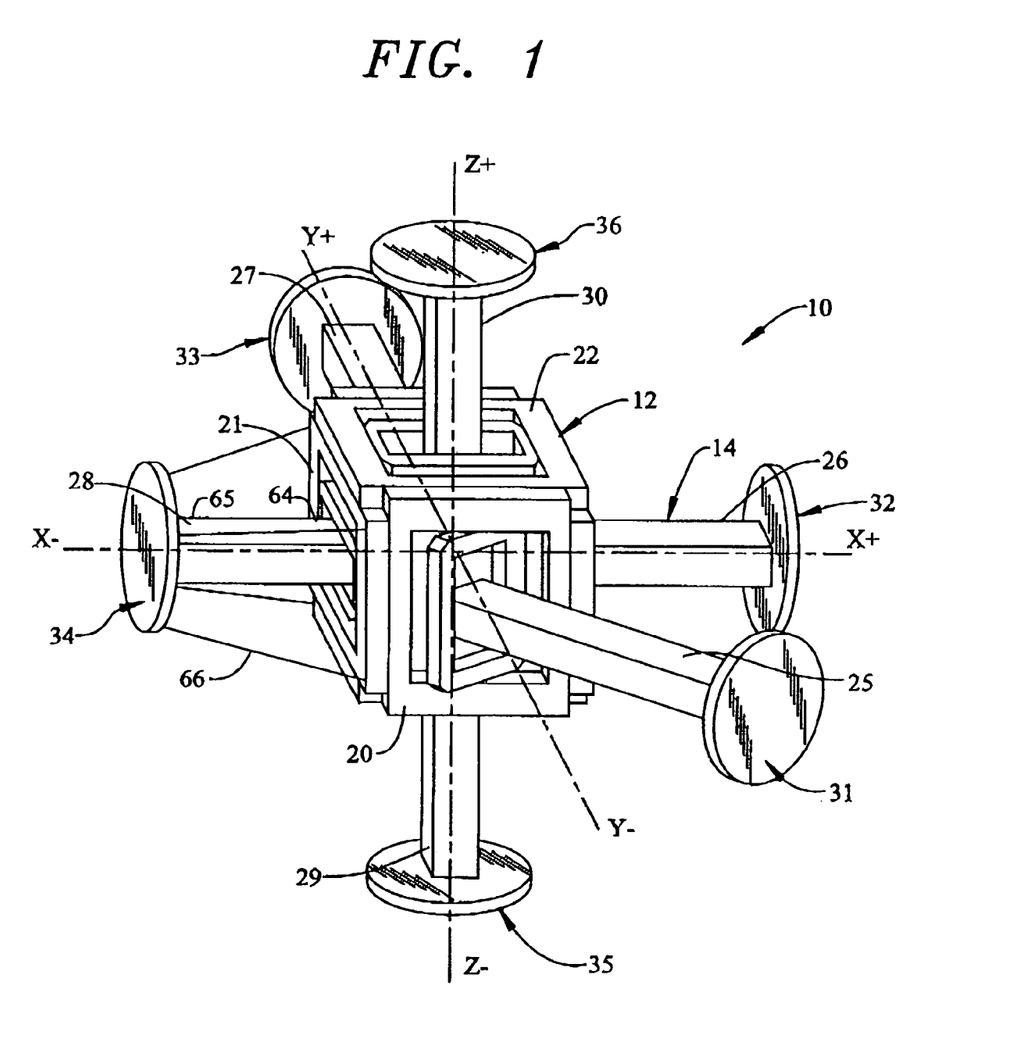
FIG. 1 is a perspective view of a self-structuring computing system housing according to a preferred embodiment of the invention.

With initial reference to FIG. 1, there is shown a single module 10 according to a preferred embodiment of the invention. Module 10 is preferably formed of two major components, a housing 12 and a set of legs 14. Housing 12 is shown as a cube but could be formed in other shapes, such as a sphere. In its cubic form, housing 12 has six faces. Only a front face 20, a left side face 21 and a top face 22 are shown. Each face provides a mounting area for a respective leg (25, 26, 27, 28, 29, 30) providing housing 12 with six legs. Legs 14 could also, if desired, be placed at each corner (not separately labeled) of housing 12 resulting in module 10 having eight legs. Legs 14 could also be placed both at each surface and each corner resulting in housing 12 having fourteen legs. Of course, any intermediate number of legs is also possible. In a preferred embodiment, housing 12 supports legs (25-30) in a pivotal manner. Each leg (25-30) is provided with a respective connecting plate 31-36. Module 10 is preferably symmetrical about all three axes and numerous modules 10 may be connected to each other by attaching respective connecting plates (31-36) to form a matrix. The lowermost modules 10 may use their connecting plates (31-36) as feet to support the matrix.

Figure 2:
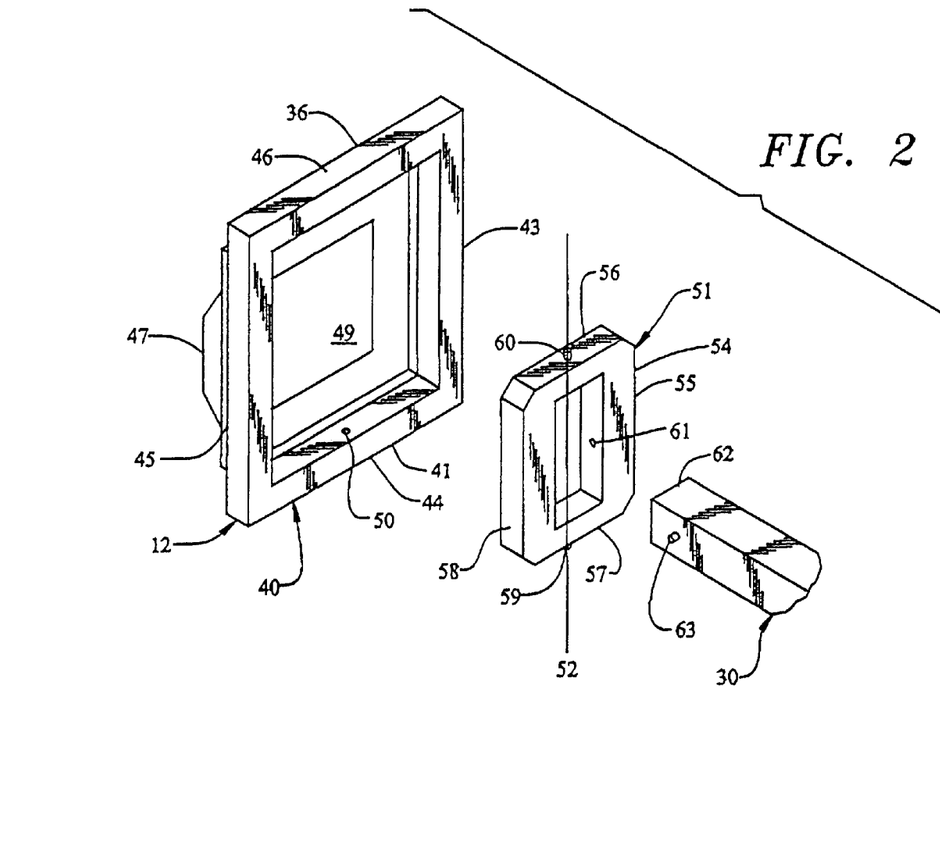
FIG. 2 is an exploded detail view showing a leg connected to a housing according to FIG. 1.

Turning now to FIG. 2, there is illustrated an exploded view of the connection of one leg 30 to housing 12. As mentioned above, a typical leg, such as leg 30, may pivot in any direction relative to housing 12 due to a connecting assembly 40. Connecting assembly 40 includes a rectangular frame 41 mounted securely in housing 12. Frame 41 includes four beams (43-46) and a curved back wall 47 which define the boundaries of a centrally located recess 49. Oppositely located beams 44 and 46 have mounting holes 50 (only one shown) located symmetrically opposite one another. Curved back wall 47 and frame 41 form recess 49 in which a pivoting assembly 51 is mounted for rotation about a first axis 52. Pivoting assembly 51 includes a rectangular housing 54 formed of four beams (55-58). Two of the beams (56,57) have outwardly extending pins 59, 60 that generally cooperate with mounting holes 50 in frame 41 to allow for the pivoting motion of pivoting assembly 51. Any sort of bearing may be used to reduce friction in this pivoting connection. The remaining two beams (55, 58) of pivoting assembly 51 include mounting holes 61 (only one shown). An end 62 of leg 30 has outwardly extending mounting pins 63 (only one shown) that generally cooperate with mounting holes 61 in pivoting assembly 51. Once again, any type of anti-friction bearing may be used, as may different types of pivoting connections. For example, a rod could be mounted in housing 54 and extend from one beam 55 to another 58 though leg 30 to form the pivoting connection. If leg 30 is restricted to pivot about only one axis, then the adjacent legs should be set up to pivot about axes that are at right angles to one another so as to avoid interference with the other pivoting legs.

As seen in FIG. 1, with specific reference to a different leg 28, one end 64 of leg 28 is attached to housing 12 as discussed above in regards to leg 30. The other end 65 of leg 28 is attached to a connecting plate 34. Legs 25-30 may be free standing or may be reinforced by tension cables 66, seen in FIG. 1, as extending from housing 12 to the edge of connecting plate 34 of leg 28. Cables 66 may be reeled in and out as necessary when leg 28 is extended, retracted or pivoted. When utilized, cables 66 will give the legs (25-30) a more ridged and stable support. The legs (25-30) themselves may be extended and retracted as desired by the use of extendable housing and motive systems.

Figure 3:
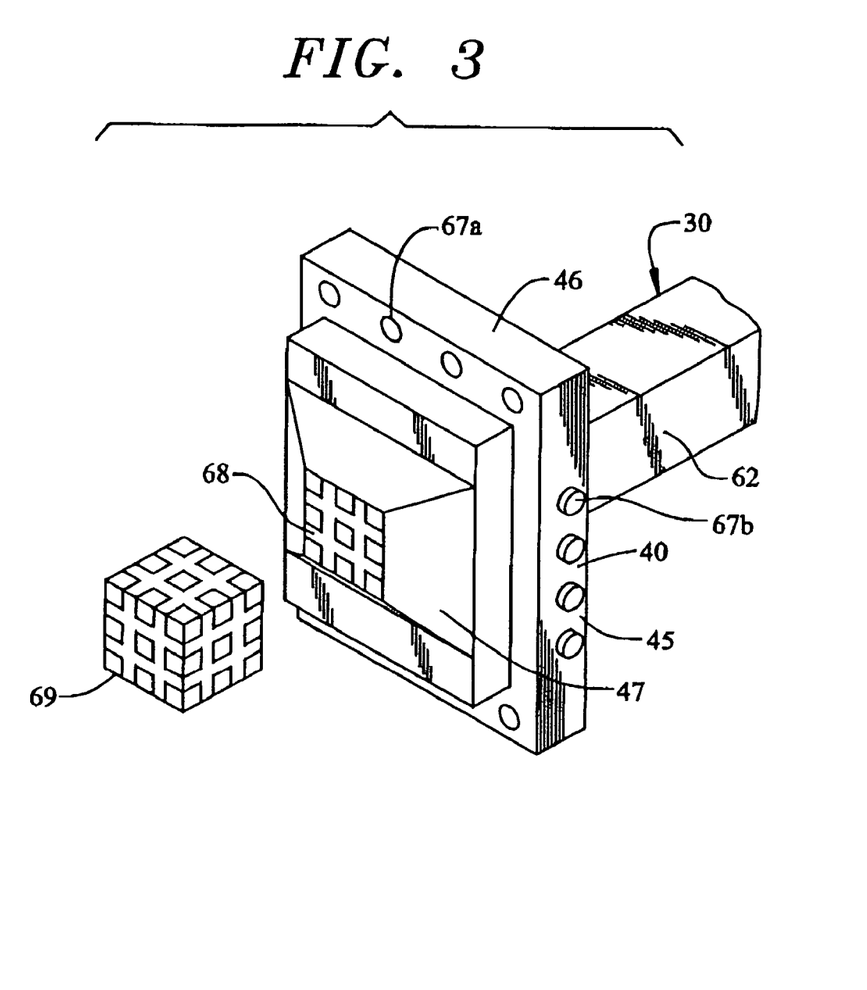
FIG. 3 shows a detail of a pivoting leg along with a battery power source.

Turning now to FIG. 3, there is shown one leg 30 pivotably mounted within its associated connecting assembly 40. Assembly 40 has a series of holes 67a mounted in a beam 46 and a series of pins 67b extending from beam 45. When six legs are connected to form a module 10, the pins 67b from one assembly 40 are inserted into respective holes (not shown) in an adjacent assembly not shown. While shown in FIG. 3 as one series of holes 67a and one series of pins 67b, it should be noted that a combination of pins and holes could exist on each beam so long as the mating connector was matched so that a pin would line up with a hole. Back wall 47 extends to a central connector 68 for attachment to a battery 69. Battery 69 is the central power source for module 10. While battery 69 is rechargeable, it is also easily replaceable should battery 69 become damaged in any way.

Figure 4:
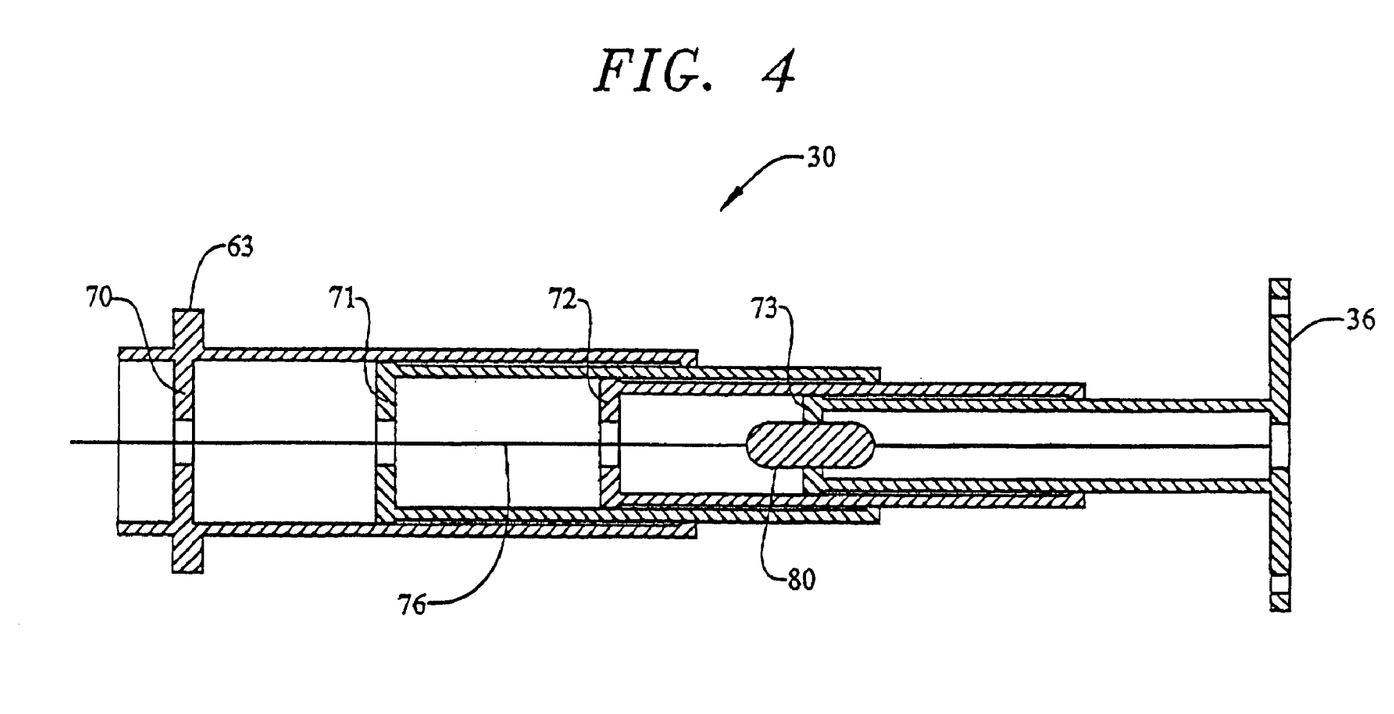
FIG. 4 shows a cross section of a leg along with the leg's internal power and communications cable.

Turning now to FIG. 4, numerous types of extendable beam structures may be used in each leg (25-30). For example, leg 30 includes a series of tubular members (70-73) that may be formed in a telescopic configuration. Of course, the tubular members (70-73) could be in the form of any type of hollow shape, such as a rectangular tube. A largest outer tube 70 includes mounting pins 63 at one end for connecting to housing 12, while a smallest inner tubular member 73 is connected to connecting plate 36. In use, only intermediate tube 71 would be moved in and out if the requirement to extend leg 30 is small and all the tubes (71-73) would be moved relative to one another if a full extension of leg 30 is required. In this manner, the strongest tubes 71 will be used most often and the smaller inner tubes 73 will be used least often.

In order to communicate between different modules, electrical and optical communications are provided between housing 12 and each connecting plate (31-36). For example, wires and optic fibers can be bundled into a cable 76 that may be extended or retracted as leg 30 is extended or retracted. To avoid having cable 76 pinched by sliding tubular members (70-73), cable 76 is protected by a pill type cable support 80. In this arrangement, innermost tubular member 73 of leg 30 is attached to connecting plate 36 at its outermost end and slidably mounted in the next largest tube 72. The next largest tube 71 is open at its outward end so as to receive tube 72. In a similar manner, several outer tubes of progressively larger size and analogous shape may be used, as demonstrated in FIG. 4 by tubular members 70-73. At its inner side, the next largest tube 70 is closed off except for a small central hole 85 for allowing passage of the cable 76. Cable support 80 is provided in the opening of the innermost tube 73. As the tubes 71, 72, 73 are retracted, the openings in each tube engage cable support 80 which is fixed to the end of innermost tube 73, thus preventing pinching of cable 76. In essence, cable support 80 guides cable 76 through each opening.

Figure 5:
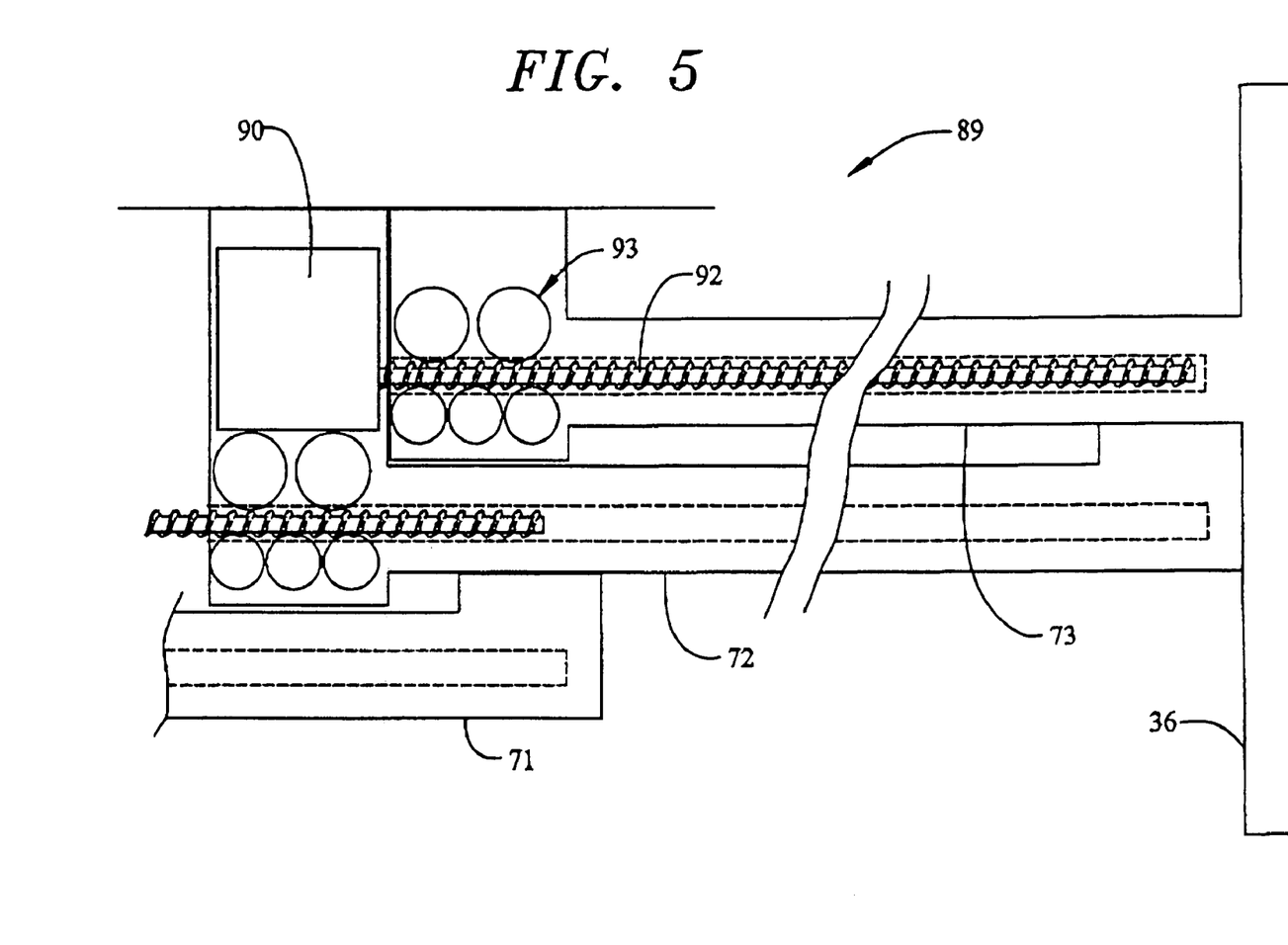
FIG. 5 depicts a drive mechanism for actuating one of the legs of the housing in FIG. 1.

As shown in FIG. 5, the propulsion of the various tubes (70-73) is by a series of screw-nut actuators 89 driven by a series of motors 90 (only one of each shown). In one embodiment, each tube (70-73) includes several series motors 90. An inner set of motors 90 each drive a respective threaded shaft 92. A nut is formed to receive the shaft 92 so that when the shaft 92 rotates, tube 73 will move axially and thus the overall leg 30 extends. The nut may be a traditional, internally-thread member or may be formed from rotating gears 93. When gears 93 are present, they provide an override feature. In a traditional screw nut linear actuator, forcibly moving the linear threaded member will break the actuator. In the current design, when excessive force is placed on the threaded member 92, the gears 93 will rotate, allowing compression of the overall leg 30. The force necessary to cause such an override situation may be adjusted as needed.

Several different additional types of linear actuators (not shown) may be used to extend and retract each leg. While a screw nut type of actuator is depicted in FIG. 5, it is envisioned that an alternative actuator in the form of a series of magnets placed along the length of the tubes (71-73) may be used. Electromagnets placed among the series of magnets could be controlled by a computing mechanism each or a central processing unit 99. By selectively activating certain magnets, the amount of distance the tubes (71-73) move relative to one another is controlled. Any inexpensive and efficient power source can be utilized such as battery 69. Power is then transmitted from the actuator to leg 30 by a variety of mechanisms. A so-called "lazy tong" mechanism or folding lattice, such as that found in a child safety gate, may also be used. One end of a folding lattice may be attached to the pivoting base tube 70 of the leg 30 and the other end attached to the connecting plate 36. As the first set of scissor legs are brought together by the actuators mounted in the leg base tube 70, the entire lattice structure extends, thus extending the leg 30. This expanding lattice would be placed within the telescoping tubular members (70-73) described above. Another arrangement could include a series of cone shaped members having openings at each end. The cones would be placed in a nested configuration. The cones would include longitudinal openings, which allow a cable to be threaded through. As the cable is pulled taut, the cones are forced to extend. Telescoping tube (70-73), such as that discussed above, could be placed around the cones to provide additional stability. An electric actuator directly built into the telescoping tubes (71-73) could also be used.

The actuators for pivoting the legs (25-30) will have to be powerful to provide enough force to move the matrix. Also, they will have enough force to hold the legs (25-30) at a desired angle once the leg (25-30) has been pivoted. A preferred mechanism for use as such an actuator is a high speed electric motor having a worm gear on its drive shaft. A brake is also provided to stop the motor. The worm gear is connected to a large gear connected to a small circular gear and a small gear drives a rack to provide for translational movement. As such motors and gears are well known in the art, they will not be discussed in detail here.

Figure 6A:
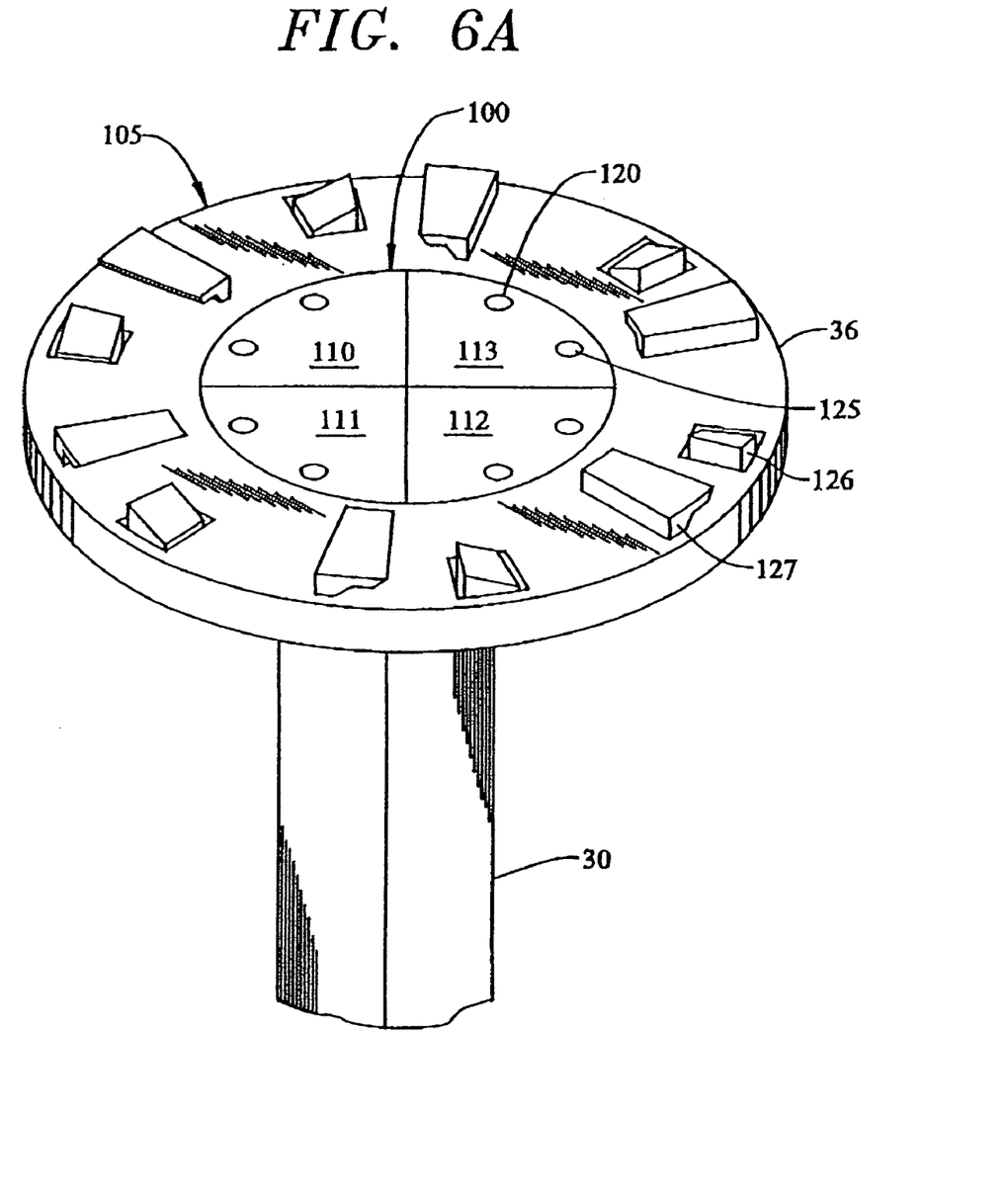
FIG. 6a shows a connecting plate of one of the legs of the housing shown in FIG. 1 according to a first preferred embodiment of the invention.

Turning now to FIG. 6a, the connection surfaces (31-36) may be of several designs to provide communication and power transfer between several modular nuclei 12. The connection surface 31 is generally divided into a central area 100 and an outer area 105 that may rotate independently if desired. Central area 100 may be subdivided into four sectors 110-113, with each sector having a power connection 120 and a communications channel 125. The use of four sets of power connections 120 and communication channels 125 allows for redundancy so that if one channel fails the others may take over. Cables 76 are connected to housing 12 at one end and connected to connecting plate 36 at the other end to provide communication between housing 12 and power connection 120 and communication channel 125. In the case of a fixed cable connection between the cable 76 and connecting plate 36, the connecting plate 36 may only rotate a limited amount relative to its tubular support member 74 in order to prevent excess torque of cables 76. Of course, if cables 76 communicate with connecting plate 36 through electrical contact pin connections rather than through a fixed connection, the connecting plate 36 may rotate indefinitely. Connecting plate 36 includes plungers 126 and hooks 127 for providing a relatively long-term mechanical connection between connecting plates as discussed in more detail below in regard to FIGS. 7a-7c.

Figure 6B:
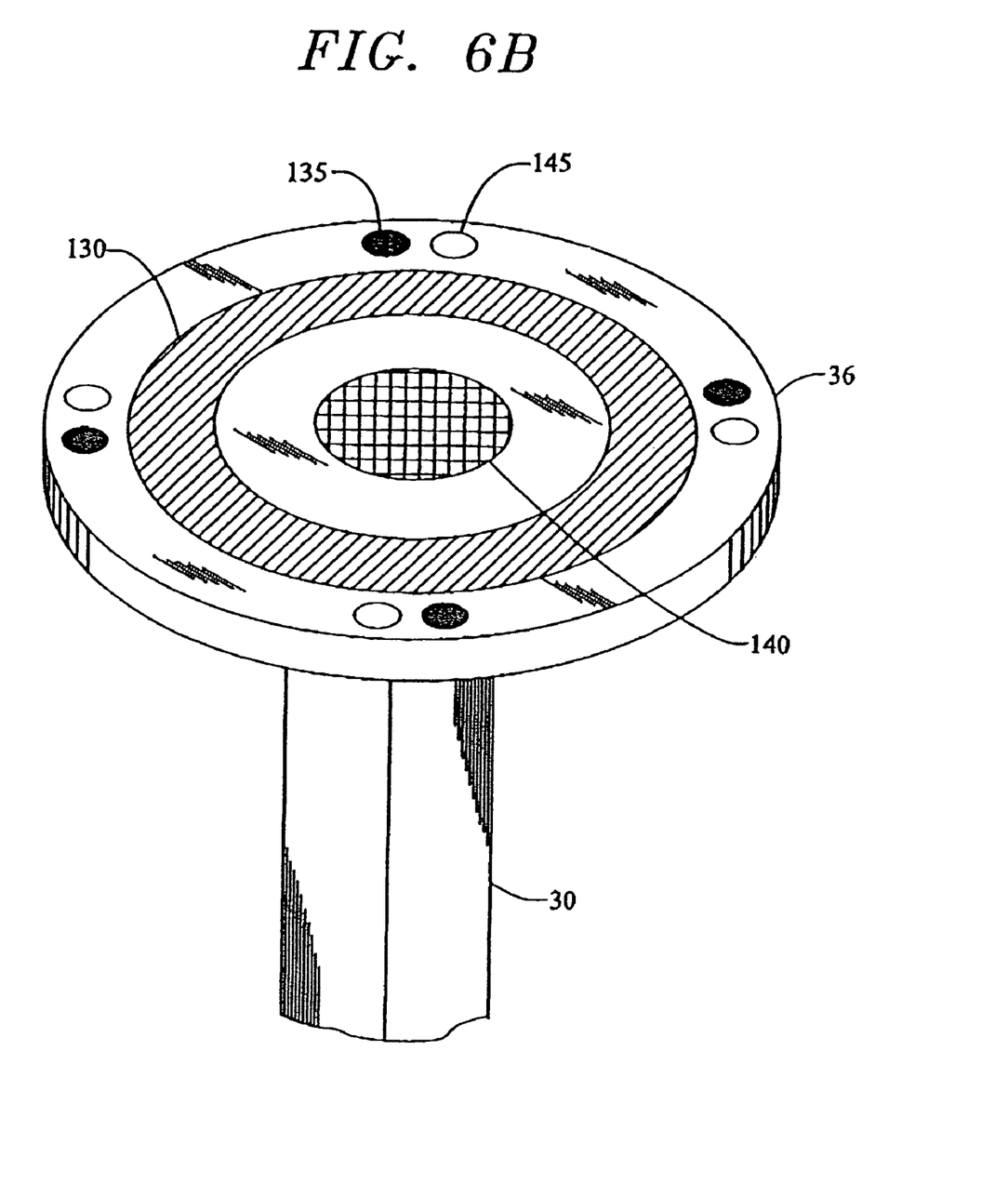
FIG. 6b shows a connecting plate of one of the legs of the housing according to a second preferred embodiment of the invention.

FIG. 6b shows an alternative connection method in which connecting plate 36 is capable of connecting to other module connecting plates using either an electromagnet 130 or connecting clamps and pins 135, for long-term or short-term connections. Additionally, electromagnets 130 could be used to send and receive signals and to transfer power through coupled mutual inductance. In the case that electromagnets 130 transmit signals and power, then a communications region 140 and power conduits may be omitted from connecting surface 36. Although FIG. 6b depicts the electromagnetic connection in conjunction with mechanical connecting pins 135, it is understood that the various mechanical connection methods can be used interchangeably with various communications methods.

Figure 7A:
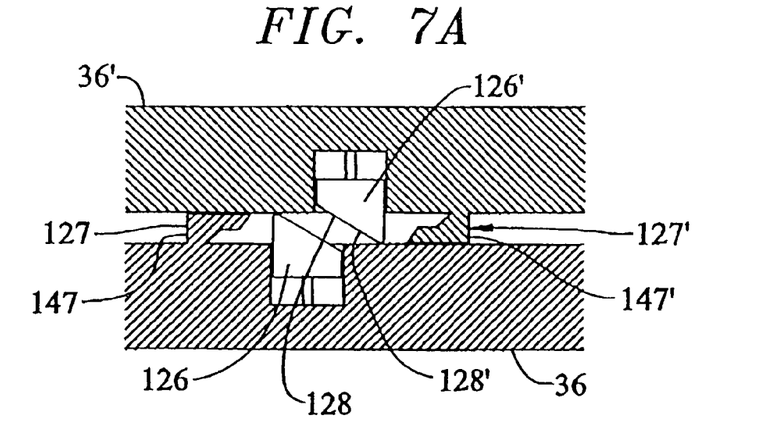
FIGS. 7a, 7b and 7c are a series of Figures showing how two different connecting plates engage one another.
Figure 7B:
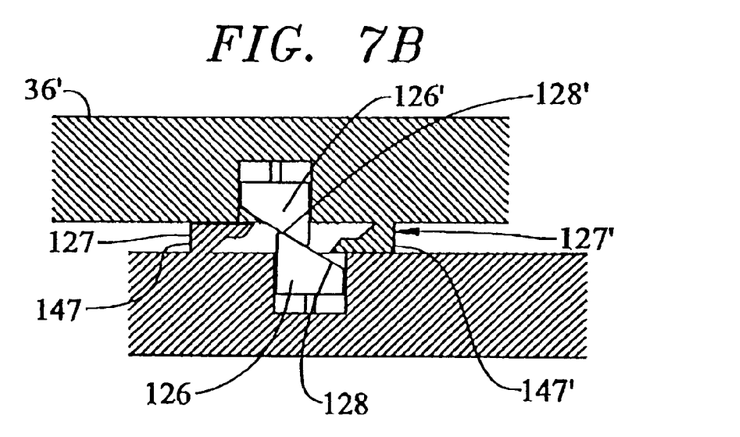
Figure 7C:
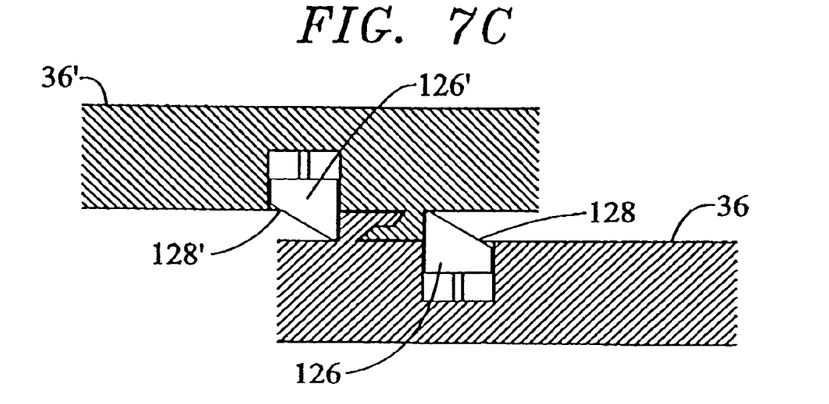

The manner in which the plunger 126 and hook 127 mechanical connection engages is depicted in FIGS. 7a-7c. As hooks 127, 127' are rotated into engagement, plungers 126, 126' will retract due to the action of their cooperating sloped top faces 128, 128'. As hooks 127, 127' pass plungers 126, 126' plungers 126, 126' extend and engage the back 147 of hooks 127, locking them in place. The connection can be broken by retracting the plungers 126, 126' and rotating connecting plate 36 in a reverse direction verses connecting plate 36'. Alternate connection mechanisms may also be used. In any case, a releasable strong connection is all that is desired.

Figure 8:
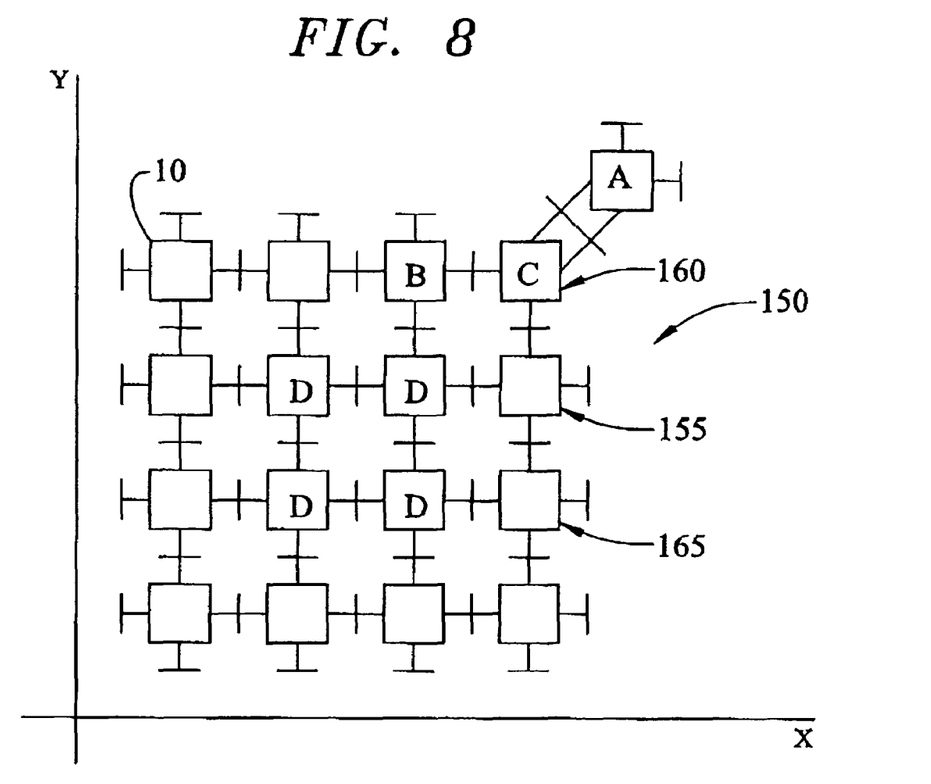
FIG. 8 shows multiple nuclei of a preferred embodiment attached to one another in a matrix.

In operation, as shown in FIG. 8, large groups of modules 12 are assembled together by joining of their connecting plates 36 as discussed above. Once a group of modules is joined into a matrix 150, several options are available as to how the modules will move relative to one another. For example, in 2-dimensional matrix 150, the central row 155 of modules may move as a group relative to the outer rows of 160, 165 modules. Central row 155 can then be used to push or pull levers or lift or lower things. If the group moves both in translation and in rotation, the group may act as a leg for overall matrix 150 and provide a way for overall matrix 150 to move. By extension, if various groups are moved and pivoted, an arm and hand (not shown) may be formed which will be able to manipulate objects so that they may be inserted or placed where desired. Additionally, numerous modules 10 may be added to the matrix 150 to increase its overall size.

In addition to moving groups of modules relative to one another, single modules 10 or groups of modules may change position relative to one another to change the overall shape of matrix 150. For example, as seen in FIG. 8, a module A may move from being attached to module B to being attached to module C. This motion may be achieved by spinning module A as it moves from B to C. Module A can also move around a corner of matrix 150 by continuing its rotation and connecting another connecting plate of module C before proceeding down the side of matrix 150. In a similar manner, module A may move along a string of other modules.

One could imagine a building being built by millions of such modules climbing the side of a column and placing themselves at the top of the column to allow yet another layer of modules to climb the side of the column to place a next layer. If the weight of the column is slight, or in the case of a row of modules, a new module can simply replace the position of the first module in the column or row, thus shifting the row or column over one space. This movement achieves the same final configuration more quickly since all the modules are interchangeable.

Rotational motion can also be caused on a large scale. For example, a series of four internal modules D surrounded by a square of twelve modules (not separately labeled) can be used to create such a rotation. Note the modules 10 shown in FIG. 8. The four internal modules D can walk around the inner surface of the outer square thus causing the internal modules D to rotate relative to the outer group. Larger groups of modules could achieve similar motion, wherein for example, a group of nine modules could rotate within a group of fourteen. With even larger groups, the inner groups could be shaped to approximate a circle and the outer groups could be shaped as a ring.

Simply extending or retracting the length of each leg in each module can also accomplish expansion and contraction of an overall matrix 150. Such motion is accomplished without the need for adding or subtracting modules to matrix 150 and may be done in an extremely quick manner. Likewise, if one wishes to expand matrix 150 in only one direction, only legs parallel to that direction would be extended. It is envisioned that numerous combinations or expanding and rotating of strategic parts of matrix 150 would give rise to extremely complicated motions in the overall matrix 150.

Figure 9:
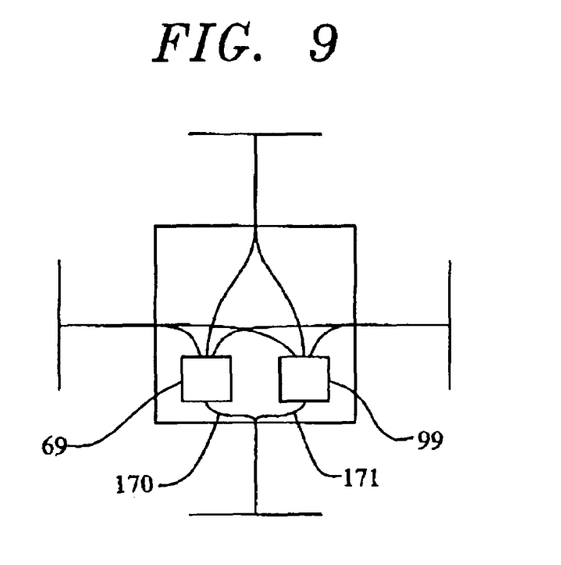
FIG. 9 shows an enlarged view of a nuclei shown in FIG. 8.

The power systems of the matrix 150, as with all systems, begin with a single module 10. As shown in FIG. 9, each module 10 preferably includes at least one battery 69 or other similar power source and at least one central processing unit 99. Wiring 170 is provided so that the power source 69 may connect to all six connecting plates (31-36) and thus connect to every other module in the matrix 150. In a similar manner, the central processing unit 99 is also connected with wiring 171 to every connecting plate (31-36) of the module 10, thus connecting the central processing unit 99 to every other processing unit in matrix 150. Each module can have a small amount of memory (e.g. 100 kilobytes). Alternatively, each set of legs in a module can contain its own small memory source. Every module is designed to have its own individual power supply; however, should one power supply fail, the module with a failed power supply may draw power from adjacent modules. Further, some modules may have their power source removed and still function using power from adjacent modules. Power may also be relayed through a series of modules. Such modules can also act as an electrical power transmission line.

Referring back to FIG. 1, communication between each housing starts with each housing identifying its orientation. There are two ways a module or set of legs can obtain an address: 1) explicitly, wherein the module or leg set stores an identification (ID) value or, 2) implicitly, wherein the collective matrix utilizes techniques such as an algorithm involving having each module relay a data packet and subtracting one from a destination counter. In a first example, the address is explicit and each module has a unique ID value. The value can be fixed and pre-assigned when the module is manufactured. An ID number can also be assigned to each set of legs on a module. A portion of the memory (whether in the core of the module or in the legs) can be used to store the ID number. The ID number can be absolute or relative. An algorithm can be used to extrapolate the address of a particular module using a combination of ID values from several modules in a matrix.

As discussed above, housing 12 can be represented as a cube having six sides. Each side is assigned a number. For example, each even number may be opposite the odd number that proceeds it. So, 2 is opposite 1; 4 is opposite 3 and 6 is opposite 5. Furthermore, the odd numbers are grouped around one corner, the even numbers are grouped around an opposite corner and the even numbers are arranged in an ascending order in a clockwise direction. So, for example, front face 20 may be assigned 1; left side face 21 may be assigned 2, etc. The arrangement of the numbers could also be that of standard left or right-handed dice in which opposite sides add up to seven. The numbers may be pre-assigned or may be assigned when two connecting assemblies are joined based on the pattern. As two connecting assemblies are engaged, their relative orientation can be used to determine which number is assigned to each side of each face of the module. Using a pattern saves times as compared to having to generate a pattern using a random number generator.

In order to arrange a matrix 150, an implicit address method is utilized. Once matrix 150 is formed, the location of each module is assigned an address or value. Instructions for a certain module can be sent to the address of the module. Indeed if a module fails, it can be replaced and the new module can take the failed module's position and address, thus causing minimal disruption by the replacement. The location of each module can be stored as a binary number. For simplicity sake, a three bit number will be used as an example. It should be understood that much larger numbers may be used for large matrixes. The addresses may be pre-assigned and stored in memory or they may be assigned by an algorithm.

Once the addresses are assigned, there are a number of ways that data may be transmitted. In a linear array, a packet of data may include the final address assigned to a counter and subtract one from the counter as it travels to each module. When the packet's counter value equals zero, the packet has arrived at its destination location. For example, a data packet could have a destination address of 011. Since the counter value is not 0, the data packet will move on, subtracting one from the counter, thus having a new counter value of 010. This process is repeated until the data packet has arrived at its destination which is determined by the counter value equaling zero. This system is particularly advantageous in that each module does not need to know its own address. For larger groups, the matrix can be divided into sets of eight with each set being labeled. If data wanted to go to the $3^{rd}$ module in the $5^{th}$ set, an address 5-011 or 101011 in binary could be used and assigned to the counter.

In a two-dimensional array, the address would be given in both directions such that each address would have a six-digit binary-number for each direction. Likewise, in a three-dimensional matrix, three six-digit binary-numbers would be used for a cube having up to 262,144 modules. Of course, in two and three-dimensional matrixes, finding the quickest path to a destination module becomes important. In a two-dimensional array, directions can be added to the data packets so that it knows not only the final destination but also a particular path to travel. For example, Value 000 could mean "stop," 010 could mean up, 011 could mean down and 100 could mean left, etc. Such directions could be relative to the data packet's direction of travel or could be absolute compared to the overall matrix orientation. The shortest path can be calculated using optimization algorithms and then transferred to the data packet. In the case of larger and larger matrixes, the larger address identifying designators may be used.

Although described with reference to preferred embodiments of the invention, it should be readily understood that various changes and/or modifications can be made to the invention without departing from the spirit thereof. In general, the invention is only intended to be limited by the scope of the following claims.

I claim:
1. A modular unit comprising:
a central housing;
a power storage unit mounted in the housing;
a drive motor mounted in the housing and connected to the power storage unit;
a commuting mechanism mounted in the housing for controlling the drive motor;
a leg having a first end and a second end, the first end being pivotally attached to the housing, wherein the leg includes:
a first tubular member having a hollow main body portion formed along a longitudinal axis with an opening situated at one longitudinal end of the main body portion;
a second tubular member slidably received through the opening of the first tubular member; and
an abutment for limiting sliding movement of the second tubular member within the main body portion of the first tubular member;
a connecting plate attached to the second end of the leg, the connecting plate including a short-term connection element and a long-term connection element; and
an electronic communication system for transmitting signals between the computing mechanism and the connecting plate through the housing and the leg.
2. The modular unit of claim 1 wherein the leg further includes;

a cable threaded through the first and second tubular members; and
a cable support attached to the second tubular member and adapted to prevent pinching of the cable.
3. A modular unit comprising:
a central housing;
a power storage unit mounted in the housing;
a drive motor mounted in the housing and connected to the power storage unit;
a computing mechanism mounted in the housing for controlling the drive motor;
a leg having a first end and a second end, the first end being pivotally attached to the housing;
a connecting plate attached to the second end of the leg, the connecting plate including a short-term connection element and a long-term connection element;
an electronic communication system for transmitting signals between the computing mechanism and the connecting plate through the housing and the leg; and
a tensioning cable having first and second ends, the cable being connected at the first end to the housing and at the second end to the connecting plate.
4. A modular unit comprising:
a central housing;
a power storage unit mounted in the housing;
a drive motor mounted in the housing and connected to the power storage unit;
a computing mechanism mounted in the housing for controlling the drive motor;
a leg having a first end and a second end, the first end being pivotally attached to the housing;
a connecting plate attached to the second end of the leg, the connecting plate including a short-term connection element and a long-term connection element, wherein the connecting plate includes a central area, an outer area, adapted to rotate independently of the central area; and
an electronic communication system for transmitting signals between the computing mechanism and the connecting plate through the housing and the leg.
5. The modular unit of claim 4, wherein the connecting plate further includes at least one power connection located in one of either the central area or the outer area.
6. The modular unit of claim 4, wherein the connecting plate further includes at least one communication channel located in one of either the central area or the outer area.
7. The modular unit of claim 4, wherein the connecting plate further includes at least one mechanical connector located in one of either the central area or the outer area.
8. A modular unit comprising:
a central housing;
a power storage unit mounted in the housing;
a drive motor mounted in the housing and connected to the power storage unit;
a computing mechanism mounted in the housing for controlling the drive motor;
a leg having a first end and a second end, the first end being pivotally attached to the housing;
a connecting plate attached to the second end of the leg, the connecting plate including a short-term connection element and a long-term connection element, wherein the short-term connection element is located at a first connection region and the long-term connection element is located at a second connection region; and
an electronic communication system for transmitting signals between the computing mechanism and the connecting plate through the housing and the leg.

9. The modular unit of claim 8, wherein the short-term connection element is an electromagnet.

10. The modular unit of claim 9, wherein the electromagnet is adapted to communicate signals and transfer power to additional modular units.

11. A modular unit comprising:
- a central housing;
- a power storage unit mounted in the housing;
- a drive motor mounted in the housing and connected to the power storage unit
- a computing mechanism mounted in the housing for controlling the drive motor;
- a leg having a first end and a second end, the first end being pivotally attached to the housing;
- a connecting plate attached to the second end of the leg, the connecting plate including a short-term connection element and a long-term connection element, wherein the connecting plate has a substantially planar surface; and
- an electronic communication system for transmitting signals between the computing mechanism and the connecting plate through the housing and the leg.

* * * * *